(12) United States Patent
Davisson et al.

(10) Patent No.: US 8,058,983 B1
(45) Date of Patent: Nov. 15, 2011

(54) BABY SEAT OCCUPANT DETECTION SYSTEM

(75) Inventors: Sally Trimmer Davisson, Lexington, KY (US); Lisa A. Sheehy, Versailles, KY (US); Angela Caporelli, Versailles, KY (US); David Ratz, Cincinnati, OH (US); Kamill R. Hilberth, Dunedin, FL (US)

(73) Assignee: Sisters of Invention, LLC, Lexington, KY (US)

( * ) Notice: Subject to any disclaimer, the term of this patent is extended or adjusted under 35 U.S.C. 154(b) by 723 days.

(21) Appl. No.: 11/779,712

(22) Filed: Jul. 18, 2007
(Under 37 CFR 1.47)

Related U.S. Application Data

(60) Provisional application No. 60/831,626, filed on Jul. 18, 2006.

(51) Int. Cl.
*H04Q 5/22* (2006.01)
(52) U.S. Cl. .......................... 340/457; 340/10.1
(58) Field of Classification Search .................. 340/457, 340/573.1, 686.1, 539.1, 522, 667
See application file for complete search history.

(56) References Cited

U.S. PATENT DOCUMENTS

| | | | |
|---|---|---|---|
| 5,598,042 A * | 1/1997 | Mix et al. ....................... 307/116 |
| 5,764,686 A * | 6/1998 | Sanderford et al. .......... 375/149 |
| 5,793,291 A | 8/1998 | Thornton |
| 5,949,340 A | 9/1999 | Rossi |
| 5,966,070 A | 10/1999 | Thornton |
| 6,104,293 A | 8/2000 | Rossi |
| 6,226,271 B1 * | 5/2001 | Dent .............................. 370/252 |
| 6,363,326 B1 * | 3/2002 | Scully ........................... 701/301 |
| 6,535,137 B1 | 3/2003 | Ryan |
| 6,714,132 B2 | 3/2004 | Edwards et al. |
| 6,812,844 B1 | 11/2004 | Burgess |
| 6,909,365 B2 | 6/2005 | Toles |
| 6,922,147 B1 * | 7/2005 | Viksnins et al. ........... 340/573.1 |
| 6,922,154 B2 | 7/2005 | Kraljic et al. |
| 6,924,742 B2 | 8/2005 | Mesina |
| 6,930,614 B2 | 8/2005 | Rackham et al. |
| 6,998,988 B1 | 2/2006 | Kalce |
| 7,339,463 B2 | 3/2008 | Donaldson |
| 2003/0034887 A1 * | 2/2003 | Crabtree et al. ............. 340/539 |
| 2003/0098792 A1 * | 5/2003 | Edwards et al. .......... 340/573.1 |

* cited by examiner

*Primary Examiner* — Shirley Lu

(74) *Attorney, Agent, or Firm* — Wyatt, Tarrant & Combs, LLP; Sarah Osborn Hill

(57) ABSTRACT

The baby seat occupant detection system of the present invention functions to reliably remind forgetful or negligent caregivers when they have an infant in a car seat inside a vehicle and have left a predetermined proximity around the vehicle. In one embodiment, the invention comprises a temperature detector for detecting unsafe temperatures and sounding an alarm to alert a caregiver when the temperature inside a vehicle has risen to a level which is unsafe for the occupant left unattended in the vehicle.

12 Claims, 5 Drawing Sheets

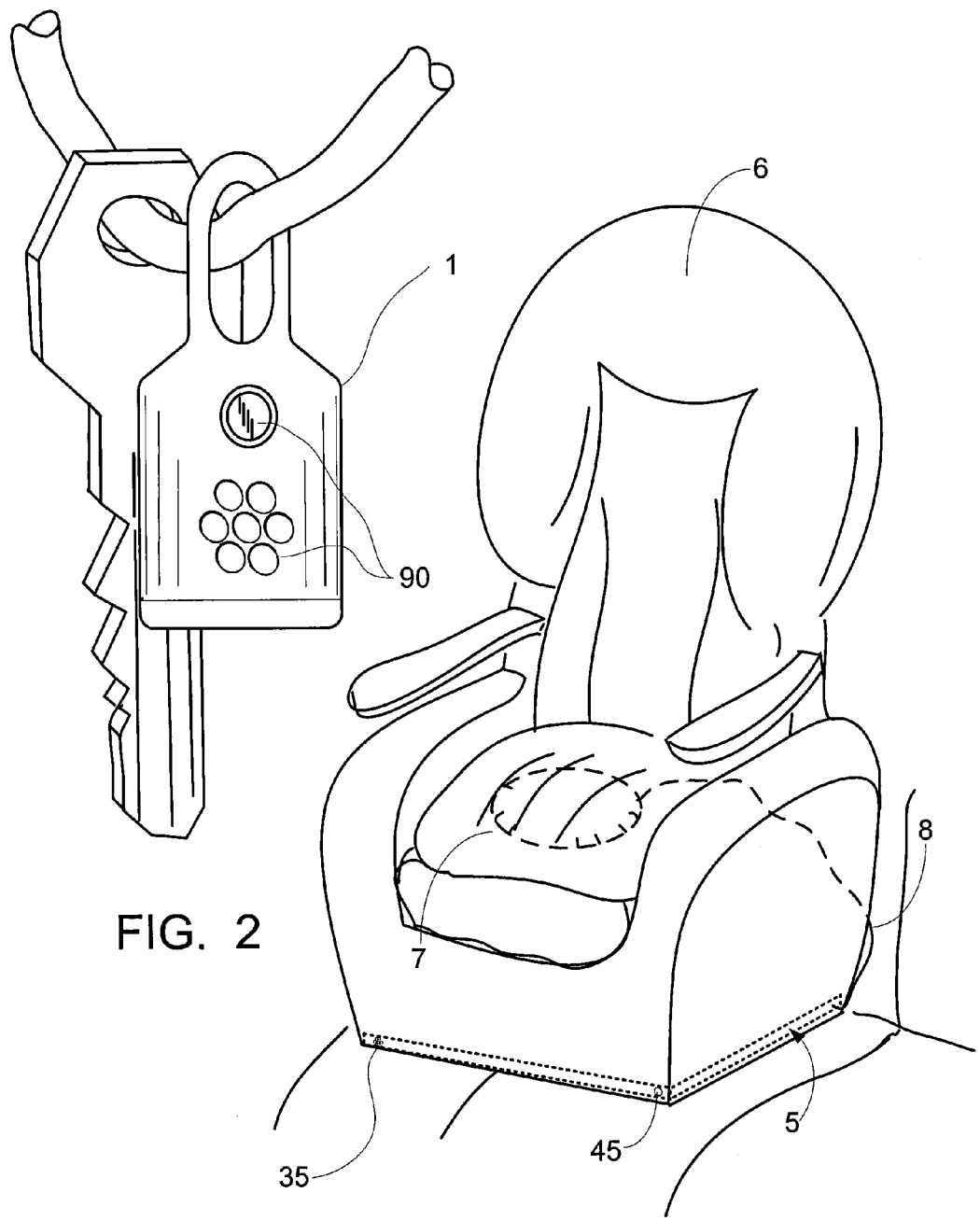

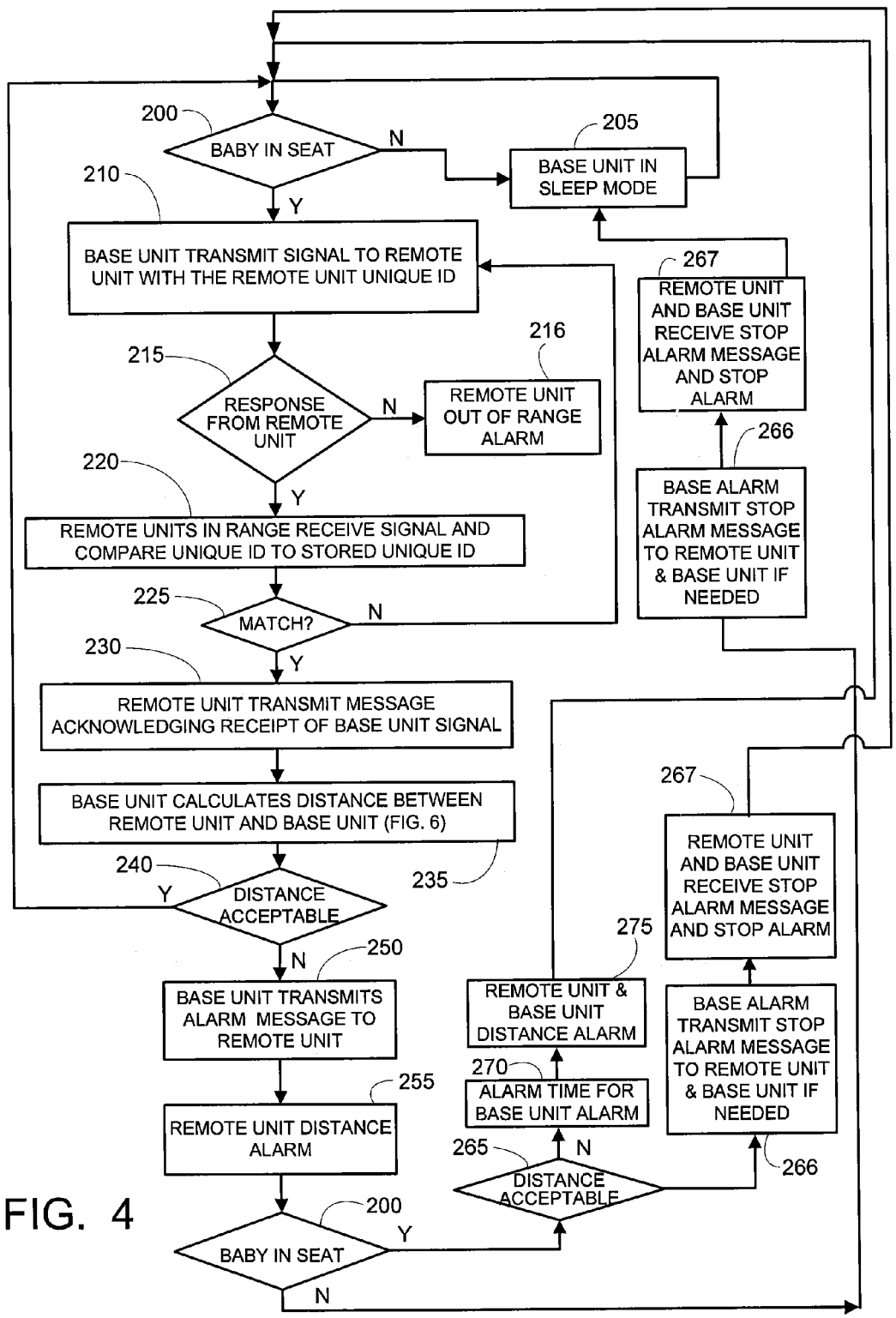

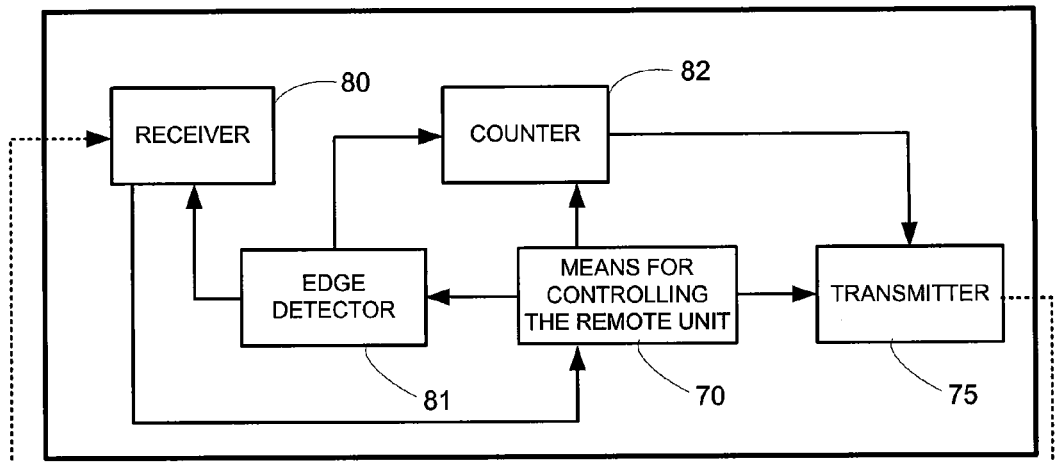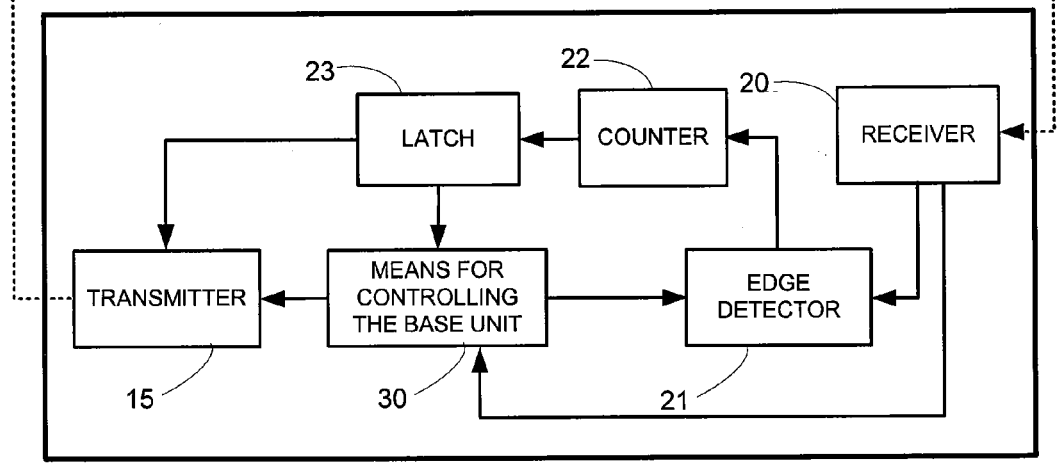
FIG. 7

BABY SEAT OCCUPANT DETECTION SYSTEM

CROSS-REFERENCE TO RELATED APPLICATIONS

This application claims priority of U.S. Provisional Application No. 60/831,626 filed Jul. 18, 2006 which is hereby incorporated by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

This invention relates to systems for detecting the presence of an infant in a car seat in an automobile or other vehicle. More particularly, this invention relates to a baby seat occupant detection system which sounds an alarm when an infant is inadvertently left in a vehicle. Even more specifically, this invention relates to a baby seat occupant detection system which alarms when an infant is left in a baby seat in a vehicle and the caregiver travels an unacceptable distance away from the vehicle or the temperature in the vehicle reaches an unacceptable level.

Federal and state laws regarding the vehicular transportation of babies require that the baby be safely strapped into a baby car seat that is itself safely restrained in the vehicle through the use of conventional seat belts or auxiliary belts specifically adapted for baby car seats. The use of a baby seat is intended to provide a safer environment for the baby during transportation to protect the baby as much as possible in the event of a collision, sudden stop or other abrupt incident that might otherwise result in the baby being thrown from the car during the incident and becoming injured.

Unfortunately, however, during the everyday haste of normal life, the driver oftentimes forgets that the baby is in the car seat after parking the vehicle, and simply walks away inadvertently leaving the baby unattended in the car seat. Not only does this raise the danger of kidnapping, but also subjects the baby to a dangerous environment in the event of inclement weather. Specifically, it is well-known that the internal temperatures of a vehicle left in the sun during hot weather will cause the interior temperature to dramatically rise to above 100° Fahrenheit. A baby strapped in the car seat is oblivious to the impending danger of life-threatening heat stroke. Older children, who may appreciate the dangers of heat stroke, may nevertheless be unable to escape because of being strapped into the car seat. Consequently, there presently exists a need for a baby seat detector which detects when a baby has been left unattended in a car seat by his or her mother, father or other caregiver, and to then sound an alarm that would alert the caregiver to the fact that he or she has left the baby behind in the car seat.

It is an object of this invention to provide an improved baby seat occupant detection system. It is another object of this invention to provide a baby seat occupant detection system which operates at low power. Another object of the present invention is to provide an improved means for determining when a caregiver has traveled an unacceptable distance from the vehicle. Another object of the present invention is to use low cost components to determine the distance between a caregiver and an infant in a baby seat and alarm if the caregiver has left a preset proximity around the vehicle. Another object of the present invention is to provide a means for calling a cell phone, 911, or OnStar or LoJack type system in a situation where a caregiver has left a predetermined proximity around the vehicle or that the temperature inside the vehicle has exceeded a preset temperature.

Another object of this invention is to provide an alarm when the power supply is below acceptable levels and means for conserving the power supply when no baby is in the baby seat or when the remote portion is inactive.

It is another objective of the present invention to provide a baby seat occupant detection system which is portable and can be moved from vehicle to vehicle. Yet another objective of the present invention is to provide a baby seat occupant detection system wherein the base unit identifies and communicates with multiple remote units such that multiple caregivers have remote units 1 that work with the same base unit. Still another object of the present invention is to provide a baby seat occupant detection system with a remote unit that identifies and communicates with multiple base units.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the invention in addition to the scope of the invention defined by the claims taken in conjunction with the accompanying drawings.

SUMMARY OF THE INVENTION

The present invention is directed to a baby seat occupant detection system that alerts the caregiver when the baby is in a seat in a vehicle and the caregiver has traveled an unacceptable distance from the vehicle. In one embodiment, the present invention includes a baby seat occupant detection system that alerts the caregiver when the baby is in a seat in a vehicle and the internal temperature of the vehicle is outside an acceptable temperature range.

The baby seat occupant detection system includes a remote unit for a caregiver, a base unit affixed to a baby seat which communicates with the remote unit, and means for calculating the distance between the remote unit and the base unit. If the distance is unacceptable, an alarm is activated at the remote unit. In one embodiment, an alarm is activated at the base unit if the distance is unacceptable.

The base unit is programmed to identify and communicate with at least one remote unit. The base unit can be programmed to identify and communicate with multiple remote units. The remote unit is programmed to identify and communicate with at least one base unit. The remote unit can be programmed to identify and communicate with multiple base units.

In one embodiment, a temperature detector monitors the internal temperature of the vehicle. An alarm is activated at the remote unit if the temperature is outside an acceptable range. In one embodiment, an alarm is activated at the base unit if the temperature is outside an acceptable range.

The baby seat occupant detection system of the present invention is portable, lightweight, and can be easily moved from one vehicle to another.

It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

FIG. 2 is a perspective view of a remote unit of the baby seat detection system.

FIG. 3 is a perspective view of a baby car seat and a base unit of the baby seat detection system.

FIG. 4 is a flow diagram of the steps carried out by the baby seat occupant detection system for alerting the caregiver that a baby has been left in a baby seat in a vehicle and the caregiver has traveled an unacceptable distance from the vehicle showing one base unit and one remote unit.

FIG. 7 is a block diagram showing one means for calculating the distance between a base unit and a remote unit.

DETAILED DESCRIPTION OF THE INVENTION

In general terms, the baby seat occupant detection system of the present invention functions to reliably remind forgetful or negligent caregivers when they have an infant in a car seat inside a vehicle and have left a predetermined proximity around the vehicle. In one embodiment, the invention includes an environmental monitor such as a temperature detector for detecting unsafe temperatures and sounding an alarm to alert a caregiver when the temperature inside a vehicle has risen to a level which is unsafe for the occupant left unattended in the vehicle.

Figure 1:
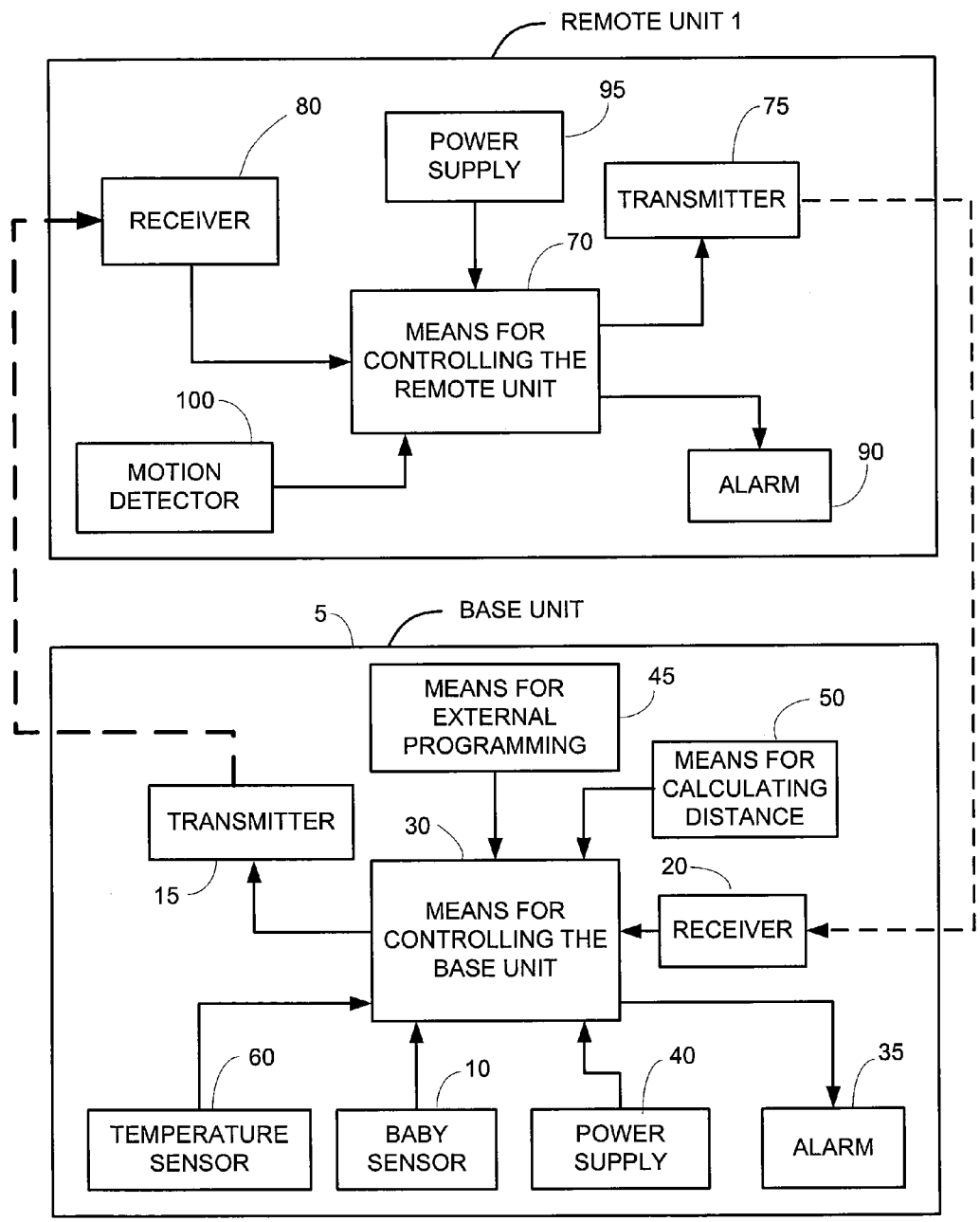
FIG. 1 is a block diagram of the baby seat occupant detection system for alerting the caregiver that a baby has been left in a baby seat in a vehicle and the caregiver has traveled an unacceptable distance from the baby seat showing one remote unit and one base unit.

Referring now to FIG. 1, the baby seat occupant detection system of the present invention comprises at least one remote unit 1 and a base unit 5. The base unit 5 is portable, lightweight, water resistant, and can be moved from vehicle to vehicle. In one embodiment, it fits under the seat of any baby car seat 6. The remote unit 1 is normally carried by a caregiver such as by attaching it to a keychain, clipping it to a belt, or incorporating it with some other object which the caregiver keeps on his person.

The base unit 5 includes a baby sensor 10, a transmitter 15 for transmitting signals to the remote unit 1, a receiver 20 for receiving signals from the remote unit 1, at least one antenna for the transmission and reception of signals, means for controlling the base unit 30, means for calculating the distance 50 between the remote unit 1 and the base unit 5, an alarm 35, means for externally programming the baby seat occupant detection system 45, and a power supply 40.

The base unit 5 receives at least one signal from the remote unit 1 via receiver 20 and transmitting at least one signal to the remote unit 1 via transmitter 15. Any transmitter, receiver, or transceiver which is compatible with the means for controlling the base unit 30 can be used, for example the Laipac TLP434A and RLP 434A or the Texas Instruments CC 1100. Those who are skilled in the art recognize that any compatible transmitter/receiver or transceiver can be used. In one embodiment, the signal is a radio frequency signal.

The base unit 5 includes means for externally programming the baby seat occupant detection system 45 such that the base unit 5 will send commands to at least one remote unit 1 and the remote unit 1 will accept commands from at least one base unit 5. In one embodiment, the means for externally programming the baby seat occupant detection system 45 is a button on the base unit 5.

Figures 5, 6:
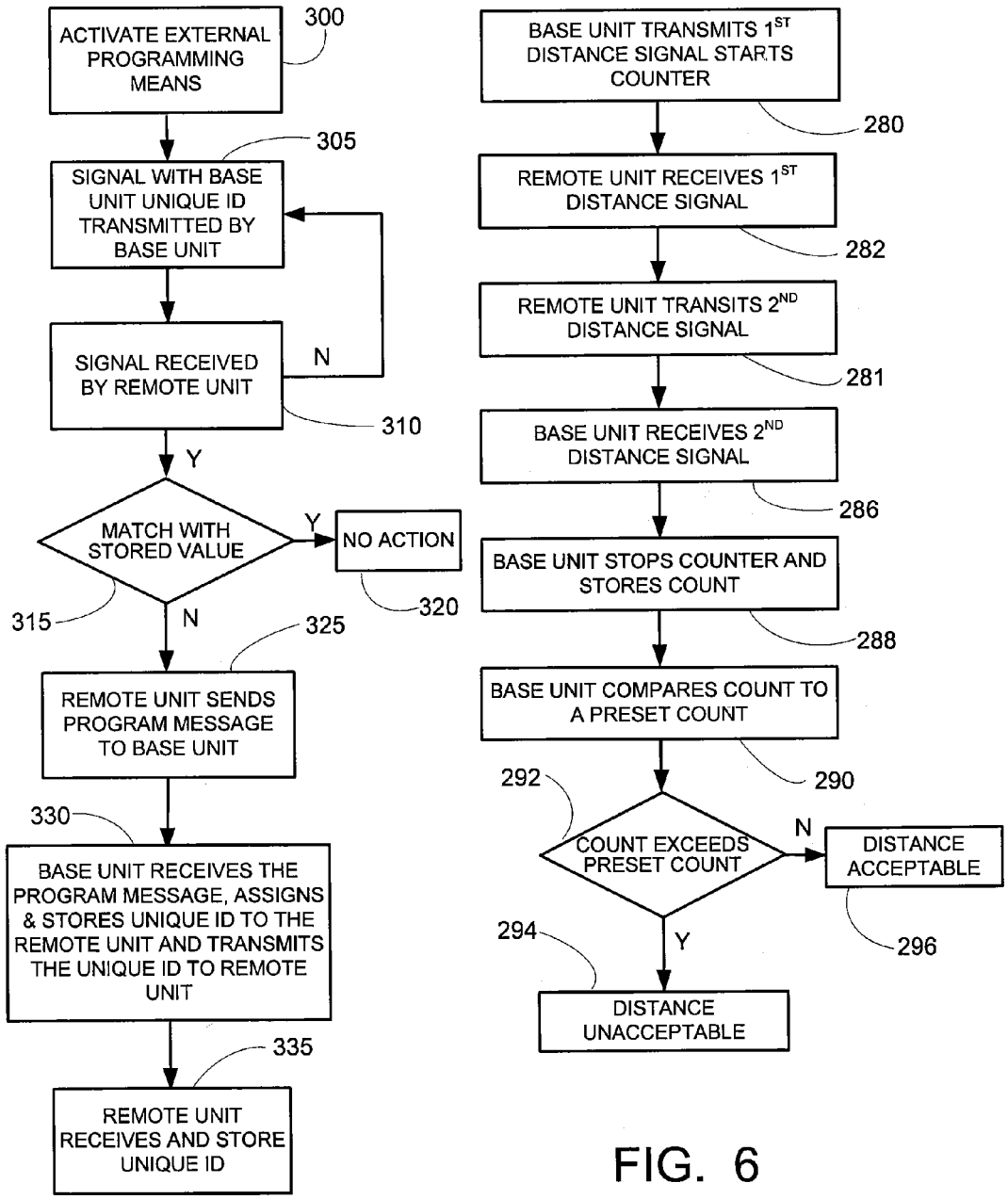
FIG. 5 is a flow diagram of the steps carried out to program a base unit and a remote unit of the baby seat occupant detection system to identify and communicate with each other.
FIG. 6 is a flow diagram of the steps carried out in one embodiment to calculate the distance between a base unit and a remote unit of the baby seat occupant detection system.

The base unit 5 identifies and communicates with certain remote units 1. The remote unit 1 identifies and communicates with certain base units 5. Each base unit 5 has a unique identifier such as an alpha-numeric number. In one embodiment, the base unit 5 and remote unit 1 are pre-programmed to identify and communicate with each other. In another embodiment, the base unit 5 and remote unit 1 are programmed by the caregiver with means for externally programming. Referring now to FIG. 5, when the means for externally programming 45 is activated (Step 300) and the remote unit 1 is within close proximity of the base unit 5, the means for controlling the base unit 30 sends a program message to the base unit transmitter 15 and the base unit transmitter 15 transmits a signal requesting that remote units 1 which have not been programmed to function with that specific base unit 5 to respond (Step 305). The receivers 80 on any remote units 1 within range of the base unit 5 receive the signal and send it to the means of controlling the remote unit 70 (Step 310). The means of controlling the remote unit 70 compares the base unit unique identifier with the base unit unique identifiers it has stored (Step 315). If the remote unit 1 is not programmed to receive commands from that particular base unit 5, the remote unit 1 transmits a program message to the base unit (Step 325). The base unit 5 receives the message and sends it to the means for controlling the base unit 30. The means of controlling the base unit 30 assigns the remote unit 1 a unique identifier such as an alpha-numeric number. The base unit 5 stores the remote unit's unique identifier and transmits the unique identifier to the remote unit 1 (Step 330). The remote unit 1 receives and stores this unique identifier Step (325). The means for controlling the base unit 30 is capable of assigning and storing multiple unique identifiers for multiple remote units 1. The means for controlling the remote unit 70 is capable of storing multiple unique identifiers assigned by multiple base units 5.

In one embodiment the signal strength from the remote unit 1 is used to verify the distance calculation. If the signal strength is high and the distance between the remote unit and base unit is small, the distance calculation is verified. However, if the signal strength is high and the distance between the remote unit 1 and the base unit 5 is large, the distance calculation is not verified and is repeated. Those of skill in the art will recognize that there are many ways to determine signal strength which can be utilized. The base unit 5 includes a baby sensor 10 which detects the presence of a baby in a car seat 6. Those who are skilled in the art will recognize that a variety of sensors could be utilized to detect the presence of an infant in a car seat 6. In one embodiment, the baby sensor 10 is a pressure sensor 7 which fits into a car seat such that the baby's weight on the sensor indicates the presence of the baby in the seat. In an alternative embodiment, the pressure sensor 7 fits under the cushion of a baby seat 6 and connects to the means for controlling the base unit 30 via a wire 8 (See FIG. 3). The other components of the base unit 5 are affixed to the baby seat (See FIG. 3).

The pressure sensor must be water proof and sensitive enough to detect very small amount of weight (i.e. the amount applied by a six pound infant). Some examples of pressure sensors 7 are a touch screen overlay which measures the change in resistance when pressure is applied, a laminated overlay (i.e. a laminate of two thin conductive layers separated by a non-conductive thin layer with holes assembled such that when pressure is applied to the laminate, the two conductive sides make contact through the holes and close the circuit), or a magnet with a hall effect sensor which measures the change in magnetic field when pressure is applied to the sensor (i.e. the magnet and hall sensor are separated by a certain distance and when a baby is placed in the seat the weight of the baby alters this distance making a measurable change in the magnetic field), but those of skill in the art will recognize there are a variety of pressure sensors which would be effective.

In another embodiment, the baby sensor 10 is a force or strain sensor. A force or strain sensor is a device with an electrical resistance which varies in proportion to the amount of strain in the device. The strain sensor must be capable of detecting very low strain. The strain sensor is affixed to the straps of the baby seat and attached to the means of controlling the base unit 30 by a wire (not shown). When the strap is moved forward to strap the baby in the baby seat, a strain is applied on the strap and the strain sensor which causes a change in electrical resistance. The other components of the base unit 5 are affixed to the baby seat.

Referring now to FIG. 4, when the baby sensor 10 detects the presence of a baby in the baby seat, the baby sensor 10 sends a message to the means for controlling the base unit 30 indicating that there is a baby in the seat (Step 200). In an alternative embodiment, the means for controlling the base unit 30 regularly monitors the baby sensor 10 to determine if there is a baby in the seat. Upon receiving a baby in seat message from the baby sensor 10, the means for controlling the base unit 30 exits low power or sleep mode. The means for controlling the base unit 30 regularly monitors the baby sensor 10 to determine if there is still a baby in the seat. If the base unit 5 determines that there is no baby in the seat for a preset amount of time, the means for controlling the base unit 30 returns the base unit 5 to low power or sleep mode (Step 205). In one embodiment, upon receiving a signal from the baby sensor 10 that an occupant is in the baby seat 6, the means for controlling the base unit 30 generates an in-seat alarm message which is sent to the base unit alarm 35. The base unit alarm 35 triggers a brief "baby-in-seat" alarm, such as a chirp, to verify to the user that there is a baby in the seat and the system is functioning.

Referring back to FIG. 1, in yet another embodiment, the means for controlling the base unit 30 is a microprocessor such as a microcomputer chip. Some examples of a microcomputer chip are the PIC 16Fxxx chipset and the MSP430F2121 microprocessor, but those who are skilled in the art will recognize that any equivalent microcomputer chip can also be utilized. These chips assure a long battery life.

Referring now to FIG. 4, upon receiving the baby in seat message and returning to full power status, the means for controlling the base unit 30 sends a message to the base unit transmitter 15 to transmit a first signal including the remote unit unique identifiers (Step 210). After a preset amount of time, if no signal is received from a remote unit 1, the means for controlling the base unit 30 sends another message to the base unit transmitter 15 to send a second signal with the remote unit 1 identifiers. If the base unit 5 does not receive any response from at least one remote unit 1 within a preset amount of time, the means for controlling the base unit 30 generates an out of range alarm command, and the base unit alarm 15 is activated (Step 216). In an embodiment where more than one remote unit 1 is programmed to function with the same base unit 5, the base unit 5 will not generate an out of range alarm if it receives a response from at least one of the remote units 1 programmed to function with it.

When the base unit receiver 20 receives a return message from a remote unit 1 acknowledging the match of a unique identifier (Step 230), the means of calculating the distance between the base unit and the remote unit 50 calculates the distance between the remote unit 1 and the base unit 5 (Step 235). Those who are skilled in the art will recognize that there are many equivalent means to calculate the distance 50 between the base unit 5 and the remote unit 1.

Referring now to FIG. 6, in one embodiment the means of calculating the distance 50 includes a counter. The means for controlling the base unit 30 generates a message to transmit a distance signal to the remote unit 1 which is sent to the base unit transmitter 15. The means for controlling the base unit 30 resets the counter on the base unit 5 to zero at the same time the message is sent. The counter begins counting. The base unit transmitter 15 sends a distance signal to the remote unit 1 (Step 280).

When the base unit 5 receives a distance signal back from the remote unit 1 (Step 286), the base unit 5 stops the counter and stores the total count (Step 288). The means for controlling the base unit 30 compares the total count to a preset value based on the allowable distance between the base unit 5 and the remote unit 1 (Step 290). If the total count exceeds the preset value, the distance is unacceptable (Step 294). Referring back to FIG. 4, if the distance is unacceptable, the means for controlling the base unit 30 generates a distance alarm message which is transmitted to the remote unit 1 via the base unit transmitter 15 (Step 250). In an embodiment where more than one remote unit 1 is programmed to communicate with the base unit 5, the alarm message is sent to all remote units 1 that are within range. The base unit 5 continues to monitor the baby sensor 10 for status (Step 200), continues to transmit to remote units 1 programmed to communicate with the base unit 5 (Steps 210-230), and continues to conduct a distance calculation between the remote unit 1 and the base unit 5 (Step 235).

Once the baby is removed from the seat or the remote unit 1 returns within an acceptable distance of the base unit 5, the means for controlling the base unit 30 generates a message to stop alarming which the base unit transmitter 15 transmits to the remote unit 1 (Steps 260, 265, 266, 267). In an embodiment where more than one remote unit 1 is programmed to communicate with the base unit 5, the stop alarming message is sent to all remote units 1 that are within range. If the baby is not removed from the seat and no remote unit 1 returns within an acceptable distance of the base unit 5 within a preset amount of time, the means for controlling the base unit 30 sends a message to the base unit alarm 35 to activate an alarm (Step 270). In an embodiment where multiple remote units 1 are programmed to work with one base unit 5, the base unit 5 calculates the distance between each remote unit 1 within range of the base unit 5. The base unit 5 will not alarm if at least one of the remote units 1 is within the preset distance.

In another embodiment, the means for controlling the base unit 30 adds a predetermined offset to the distance calculation to reduce the error in the distance calculation. This offset is specific to each remote unit 1. The offset is calculated when the base unit 5 is programming the remote unit 1 with a unique identifier. After the unique identifier for the remote unit 1 is stored in the means for controlling the base unit 30, the means for controlling the base unit 30 begins a distance calculation (Step 235). Because the remote unit 1 is in close proximity to the base unit 5 during this programming step, the distance calculated is equal to the error resulting from the processing time in both the remote unit 1 and the base unit 5—the offset. The offset is stored in the means for controlling the base unit 30 as the offset value for that particular remote unit 1. In an embodiment where there is more than one remote unit 1, the base unit 5 stores an offset value for each remote unit 1.

Referring now to FIG. 7, in another embodiment, where the processing time of the means for controlling the base unit 30 would introduce error into the distance calculation, a signal edge detector 21, such as a NC7SV74 D-Flip Flop or similar edge detector, is employed. When the distance signal is sent (See FIG. 6), the means for controlling the base unit 30 also enables the edge detector 21 to receive any return signal from the remote unit 1. Upon receiving a return signal, the edge detector 21 stops the counter 22 and stores the total count in a latch 23. The means for controlling the base unit 30 reads the count from the latch 23 and then completes the distance calculation.

In one embodiment the signal strength from the remote unit 1 is used to verify the distance calculation. If the signal strength is high and the distance between the remote unit and base unit is small, the distance calculation is verified. However, if the signal strength is high and the distance between the remote unit 1 and the base unit 5 is large, the distance calculation is not verified and is repeated. Those who are skilled in the art will recognize that there are many methods of measuring signal strength which can be utilized.

The means for controlling the base unit 30 monitors the base unit power supply 40 and generates an alarm message if power falls below a preset limit, sends a message to the base unit alarm 35 activating the low power alarm. The alarm 35 is a light, sound, digital read out, etc.

The base unit 5 of the present invention includes an alarm 35 such as any light, sound or other indicator which is compatible with the other parts of the base unit 5. Those who are skilled in the art will recognize that many light, sound or vibration indicators such as a LED or synthesized tone may be integrated into the base unit 5. In one embodiment, the alarm 35 is capable of initiating multiple alarms to indicate low power, baby in seat, dangerous temperature in car, programming complete, system error, etc. In another embodiment, the alarm 35 comprises a voice chip, such as the ISD1110S, an amplifier, and a speaker. The speaker is mounted near the baby seat so that it can be heard by those passing the vehicle. The alarm 35 that is triggered is a spoken alarm such as "Help, baby in danger," "low power," "system error," "remote unit programmed," etc.

The base unit 5 of the baby seat occupant detection system of the present invention includes a power supply 40. Those who are skilled in the art will recognize that any commercially available power supply is available as a power source. For example, in one embodiment, any commercially available batteries can be used as the power supply. In another embodiment, the batteries are rechargeable. In yet another embodiment, the rechargeable batteries of the power supply can be recharged by connecting the power supply to a vehicle 12 volt outlet. In still another embodiment, the base unit 5 is connected directly to the 12 volt car battery outlet. In an alternative embodiment, solar cells are affixed to and supply power to the base unit 5.

In yet another embodiment, the base unit 5 includes a temperature sensor 60 for monitoring the internal temperature of the vehicle when the baby is in the seat. For example, the temperature sensor 60 is a digital or analog sensor, a thermocouple, thermistor, resistance temperature detector, thermometer, or similar temperature sensor 60. Those who are skilled in the art will recognize that other types of temperature sensor 60s will also be effective. The temperature sensor 60 communicates with the means for controlling the base unit 30. In one embodiment, it is connected to the means for controlling the base unit 30 by a wire and may be affixed to the car seat with a clip or similar fastener. In another embodiment, the temperature sensor 60 is mounted inside the vehicle and communicates with the base unit 5 via wireless communications.

When there is a baby in the seat, the means for controlling the base unit 30 regularly monitors the temperature sensor 60 for the internal temperature of the vehicle and compares the actual internal vehicle temperature to a preset value. If the actual temperature exceeds a first preset value, the means for controlling the base unit 30 generates an alarm message. Alternatively, if the internal vehicle temperature is below a second preset value, the means for controlling the base unit 30 generates an alarm message. The base unit transmitter 15 transmits the alarm message to the remote unit 1. The remote unit 1 receives the message, sends it to the means for controlling the remote unit 70 which sends an alarm message to the remote unit alarm 90 thus activating remote unit alarm 90. In one embodiment, the alarm message activates the base unit alarm 35.

The means for controlling the base unit 30 continues to monitor the baby sensor 10 status and the temperature during the alarm period. When the baby is removed from the seat or the temperature is below the first preset value or above the second preset value, the means for controlling the base unit 30 generates a message to stop alarming which is transmitted to the remote unit 1. The remote unit 1 receives the message, sends it to the means for controlling the remote unit 70 which sends a stop alarming message to the remote unit alarm 90 which stops alarming.

In one embodiment, the means for externally programming the baby seat occupant detection system 45 may be depressed to reset the alarm 90 and stop it from alarming.

The remote unit 1 includes a means for controlling the remote unit 70, a transmitter 75 for sending signals to the base unit 5, a receiver 80 for receiving messages from the base unit 5, at least one antenna, an alarm 90, and a power supply 95.

The remote unit 1 of the present invention receives at least one signal from the base unit 5 and transmits at least one signal to the base unit 5. Any transmitter, receiver, or transceiver which is compatible with the means for controlling the remote unit 70, for example, Laipac TLP434A and RLP 434A, or the Texas Instruments CC1100, can be used. In one embodiment, the signal is a radio frequency signal.

The remote unit 1 of the present invention includes an alarm 90 such as any light, sound, vibration, digital display, or other indicator which is compatible with the other components of the remote unit 1. Those who are skilled in the art will recognize that many light, sound or vibration indicators such as LEDs or synthesized tones may be integrated into the remote unit 1. In one embodiment, the alarm 90 is capable of initiating multiple alarms to indicate different states of alarm such as low power, baby still in seat, dangerous temperature in vehicle, programming complete, system error, etc.

The remote unit 1 of the baby seat occupant detection system of the present invention includes a power supply 95. The power supply 95 is small, light-weight, and commercially available. Those who are skilled in the art will recognize that many commercially available power supplies are available, for example a 3 to 3.6 Volt battery or a 300 mAH button battery.

In one embodiment, the means for controlling the remote unit 70 is a microprocessor such as a microcomputer chip. Some examples of a microcomputer chip are the PIC 16Fxxx chipset and the MSP430F2121 microprocessor, but those who are skilled in the art will recognize that any equivalent microcomputer chip can also be utilized. These chips assure a long battery life.

Referring now to FIG. 4, when the remote unit receiver 80 receives a signal containing a unique identifier, the means for controlling the remote unit 70 compares that unique identifier to the remote unit's 1 stored unique identifiers (Step 220). If there is a match, the means for controlling the remote unit 70 sends a message to the remote unit transmitter 75 which transmits a signal to the base unit 5 verifying the match (Steps 225 and 230).

The remote unit 1 receives a distance signal from the base unit 5 and returns a distance signal. In one embodiment (See FIG. 7), where the processing time of the means for controlling the remote unit 70 would introduce error into the distance calculation, a signal edge detector 81, such as a NC7SV74 D-Flip Flop or similar edge detector, is employed. When the acknowledgement signal is sent, the means for controlling the remote unit 70 also enables the edge detector 81 to receive any return signal from the base unit 5. Upon receiving a return distance signal, the edge detector 81 starts a counter 82. When the counter 82 reaches a preset value, it sends a signal to the remote unit transmitter 75 to send a second distance signal to the base unit 5 The preset count is set at a value longer than the actual processing delay. While the actual processing delay is variable and introduces a variable error into the calculation, using a preset count for the delay returns the same delay error each time which is factored into the distance calculation. For example, the preset count is the amount of time it takes for the remote unit 1 to switch from transmit mode to receive mode.

Referring back to FIG. 4, the receiver on the remote unit 1 receives alarm messages from the base unit 5 and sends them to the means for controlling the remote unit 70 which generates a message regarding the type of alarm (Step 250). The alarm message is sent to the remote unit alarm 90 which sounds the appropriate alarm (Step 255). The remote unit receiver 80 receives stop alarming messages from the base unit 5 which it sends to the means for controlling the remote unit 70. The means for controlling the remote unit 70 then generates a message to stop alarming which it sends to the remote unit alarm 90. The remote unit alarm 90 stops alarming (Step 267).

The means for controlling the remote unit 70 regularly monitors remote unit power supply 95 and generates an alarm message if power falls below a preset limit which is sent to the remote unit alarm 90. The alarm 90 is then activated indicating low power. In one embodiment, the means for controlling the remote unit 70 sends the low power alarm message to the transmitter which transmits it to the base unit 5. The base unit 5 receives the message, the means for controlling the remote unit 70 commands the base unit 5 alarm to activate the remote unit low power alarm.

In one embodiment, after a certain amount of time when the remote unit 1 had not received any signals from any base unit 5, the means for controlling the remote unit 70 initiates a lower power status by turning off multiple components of the remote unit 1. The remote unit receiver 80 is cycled on and off at regular time intervals.

In one embodiment, the remote unit 1 includes a motion detector 100 for activating the low power or sleep mode of the remote unit 1, like the SQ-SEN-200 motion switch manufactured by SignalQuest, which detects tilt or vibration. When the remote unit 1 is stationary for a predetermined amount of time, for instance while the caregivers are at home or asleep and the remote unit 1 is not on their person, the remote unit 1 activates the low power or sleep mode. When the remote unit 1 is in motion, the motion detector 100 regularly sends a signal to the means for controlling the remote unit 70. When the means for controlling the remote unit 70 does not receive a signal from the motion detector 100 for a preset amount of time, the means for controlling the remote unit 70 initiates the low power or sleep mode by turning off the remote unit 1 receiver. When the remote unit 1 is moved again, for instance the remote unit 1 is picked up and added to a purse or pocket, the motion detector 100 detects the motion and sends a signal to the means for controlling the remote unit 70. The means for controlling the remote unit 70 exits low power or sleep mode by turning on the remote unit receiver 80.

In another embodiment, the means for controlling the remote unit 70 has a power saving feature. When the remote unit 1 is in motion, but a preset amount of time has elapsed since the remote unit 1 has received a message from a base unit 5, the means for controlling the remote unit 70 turns off most of the components on the remote unit 1 except for the receiver 80. It also cycles the receiver 80 on and off for a predetermined amount of time until it receives a signal from the base unit 5 and returns to full power status.

In one embodiment, the base unit 5 of the present invention includes means of communicating via telephone. For example, a cellular modem is included in the base unit 5 and connected to the means for controlling the base unit 30. The means for controlling the base unit 30 generates an alarm such as a distance alarm, low battery alarm, high temperature alarm, etc., and sends a message to the cellular modem to call a preset phone number. The cellular modem places the call and plays a predetermined message when the call is answered such as "baby in seat," "high temperature in vehicle," "low battery," etc. In another embodiment, the cellular modem stores multiple phone numbers and is programmed to call them in a predetermined order, for example to call the first programmed number and wait for an answer, if the phone is not answered, a second programmed number is called, etc.

In another embodiment, the base unit of the present invention includes means of communicating with GPS, satellite, and programs such as OnStar and LoJack.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A baby seat occupant detection system comprising:
   a base unit for installation inside a vehicle adjacent to a baby seat, the base unit having a base unit microprocessor, a base unit transmitter electrically connected to the base unit microprocessor for transmitting signals, and a base unit receiver electrically connected to the base unit microprocessor for receiving signals; a baby sensor for detecting the presence of a baby seat occupant, the sensor adjacent the baby seat and in communication with the base unit; a portable remote unit in communication with the base unit having a remote unit microprocessor, a remote unit transmitter electrically connected to the remote unit microprocessor for transmitting signals to the base unit, and a remote unit receiver electrically connected to the remote unit microprocessor for receiving signals from the base unit; a counter for measuring the distance between the base unit and the remote unit electrically connected to the base unit, the counter set to zero and initiated concurrently when a first distance signal is transmitted to the remote unit by the base unit transmitter, the counter stopped when a return distance signal generated by the remote unit and transmitted to the base unit is received by the base unit receiver thereby generating a count, the count for comparing to a preset count to determine whether the distance between the base unit and the remote unit is acceptable; a remote unit alarm in communication with the remote unit for providing notice of alarm conditions in the vicinity of the remote unit, the remote unit alarm activated when the count exceeds the preset count; and a signal edge detector electrically connected to the base unit receiver and the counter, the signal edge detector stopping the counter when the return distance signal is received by the base unit receiver thereby bypassing the base unit microprocessor and reducing the error in the distance measurement caused by processing time.

2. The baby seat occupant detection system of claim 1 further comprising: means for externally programming the baby seat occupant detection system in communication with the base unit microprocessor, wherein said means for externally programming configures said base unit to identify and communicate with at least one remote unit and configures said remote unit to identify and communicate with at least one base unit.

3. The baby seat occupant detection system of claim 1 where: said baby sensor is a pressure sensor; and said pressure sensor is electrically connected to the base unit.

4. The baby seat occupant detection system of claim 1 further comprising: a cellular modem in communication with the base unit microprocessor wherein the base unit places calls to preprogrammed telephone numbers upon receiving an alarm message from the base unit controlling means.

5. The baby seat occupant detection system of claim 1 wherein: said base unit is in communication with a plurality of remote units.

6. The baby seat occupant detection system of claim 1 wherein: said remote unit is in communication with a plurality of base units.

7. The baby seat occupant detection system of claim 1 further comprising: a motion detector electrically connected to the remote unit and a low power mode of the detection system initiated by the motion detector when the remote unit remains stationary for a predetermined period of time.

8. The baby seat occupant detection system of claim 1 further comprising: a temperature sensor for installation inside the vehicle in communication with the base unit, the remote alarm activated when an internal vehicle temperature exceeds a preset limit and an occupant is present in the baby seat.

9. The baby seat occupant detection system of claim 1 further comprising: a signal edge detector for reducing the error in a distance measurement between the remote unit and the base unit caused by processing time, the signal edge detector electrically connected to the remote unit receiver and activated when a signal is received from the base unit whereby the signal edge detector ends the distance measurement when activated bypassing the remote unit microprocessor and substantially reducing processing time error.

10. The baby seat occupant detection system of claim 1 further comprising: a base unit alarm in communication with the base unit for providing notice of alarm conditions in the vicinity the vehicle, the base unit alarm activated when the count exceeds the preset count.

11. The baby seat occupant detection system of claim 8 wherein: the base unit alarm is activated when an internal vehicle temperature exceeds a preset limit and an occupant is present in the baby seat.

12. The baby seat occupant detection system of claim 1 further comprising: a base unit power supply electrically connected to the base unit; and a remote unit power supply electrically connected to the remote unit.

* * * * *